US012760428B2

(12) United States Patent
Højlund Nielsen et al.

(10) Patent No.: US 12,760,428 B2
(45) Date of Patent: Oct. 13, 2026

(54) METHOD FOR CRACKING AMMONIA

(71) Applicant: HALDOR TOPSØE A/S, Kgs. Lyngby (DK)

(72) Inventors: Poul Erik Højlund Nielsen, Fredensborg (DK); Pat A. Han, Smørum (DK); John Bøgild Hansen, Humlebæk (DK)

(73) Assignee: TOPSOE A/S, Kgs. Lyngby (DK)

( * ) Notice: Subject to any disclaimer, the term of this patent is extended or adjusted under 35 U.S.C. 154(b) by 641 days.

(21) Appl. No.: 18/246,729

(22) PCT Filed: Nov. 3, 2021

(86) PCT No.: PCT/EP2021/080551
§ 371 (c)(1),
(2) Date: Mar. 27, 2023

(87) PCT Pub. No.: WO2022/096529
PCT Pub. Date: May 12, 2022

(65) Prior Publication Data

US 2023/0383420 A1 Nov. 30, 2023

(30) Foreign Application Priority Data

Nov. 4, 2020 (EP) .................................... 20205667

(51) Int. Cl.
*C01B 3/047* (2026.01)
*C25B 1/04* (2021.01)
*C25B 9/05* (2021.01)

(52) U.S. Cl.
CPC ................ *C25B 1/04* (2013.01); *C01B 3/047* (2013.01); *C25B 9/05* (2021.01); *C01B 2203/0277* (2013.01); *C01B 2203/1052* (2013.01); *C01B 2203/1064* (2013.01); *C01B 2203/148* (2013.01); *C01B 2203/80* (2013.01)

(58) Field of Classification Search
None
See application file for complete search history.

(56) References Cited

U.S. PATENT DOCUMENTS

2013/0266506 A1 10/2013 Hikazudani et al.

FOREIGN PATENT DOCUMENTS

| | | | | |
|---|---|---|---|---|
| CN | 210560792 | U | | 5/2020 |
| CN | 210736904 | | * | 6/2020 |
| CN | 111871162 | A | | 11/2020 |
| JP | 2009067650 | A | | 4/2009 |

OTHER PUBLICATIONS

Communication dated Jun. 18, 2021 and Search Report dated Jun. 10, 2021 issued by the European Patent Office in corresponding European Patent Application No. 20205667.7. (7 pages).

International Search Report (PCT/ISA/210) and Written Opinion (PCT/ISA/237) mailed on Jan. 17, 2022 by the European Patent Office as the International Searching Authority for International Application No. PCT/EP2021/080551. (9 pages).

* cited by examiner

*Primary Examiner* — Sheng H Davis
(74) *Attorney, Agent, or Firm* — Boone IP Law

(57) ABSTRACT

The present invention refers to a method for cracking ammonia, producing hydrogen and generating electrical power including electrolysis of water in feed ammonia, evaporation, pre-heating and cracking of ammonia, using ammonia synthesis catalysts at low temperatures. A method for cracking ammonia including a) electrolysis of water in feed ammonia, wherein feed ammonia includes make-up ammonia; b) evaporation; c) cracking; wherein cracking of ammonia takes place between 300-700° C., using ammonia synthesis catalysts.

14 Claims, 3 Drawing Sheets

METHOD FOR CRACKING AMMONIA

FIELD OF INVENTION

The present invention provides a method for cracking ammonia and a method for producing hydrogen, comprising electrolysis of water in feed ammonia, upstream to an ammonia cracker. The present invention provides also a method for generating electrical power. The methods of the present invention improve efficiency and reduce costs of ammonia decomposition or cracking at low temperatures, while increasing the total yield of produced hydrogen. The present invention is relevant for all technical fields using ammonia as a source of energy and/or for production of hydrogen and electrical power.

BACKGROUND ART

Liquid ammonia is an important source for the production of hydrogen because it is an important energy carrier, in particular for the generation of electrical power in regions with few or no fuel sources. As energy carrier, liquid ammonia may also act as a source to even out the fluctuating electricity production by renewable energy technologies such as wind, solar and hydro power.

To use ammonia as an energy carrier or hydrogen carrier, ammonia can be utilized directly in combustion engines/gas turbines or fuel cells and/or it can be cracked/decomposed into hydrogen and nitrogen. The decomposed ammonia can be fed to a gas turbine or hydrogen can be recovered for fuel cells or other use. Today's conventional ammonia is produced from steam reforming of natural gas or coal gasification. A small production of ammonia is produced from electricity feeding a water electrolysis for hydrogen production, and this production method is expected to grow. The produced ammonia contains water because typically the makeup syngas contains water, which is convenient for storage of ammonia since water prevents stress corrosion cracking of the storage tank wall, usually made of metal. If the makeup syngas is free of water, then the water will be added to the produced ammonia.

The advantage of ammonia as energy carrier is that liquid ammonia is easier to transport and to store, than for instance natural gas or hydrogen gas. Additionally, storing energy in ammonia is less expensive than e.g. in hydrogen or batteries. Due to transport requirements, traded liquid ammonia normally contains water, even when it is called anhydrous. The water content of make-up ammonia is typically in the range of 0.2-0.5 wt %. The ammonia produced from water, air and renewable energy via water electrolysis will be free of water, but again water will be added for storage and transportation purposes.

In the ammonia cracking process, gaseous ammonia is dissociated into a mixture of hydrogen and nitrogen gases in the reversible reaction:

$$2NH_{3\,(g)} \leftrightarrows N_{2\,(g)} + 3H_{2\,(g)} \qquad \text{(A)}$$

Reaction (A) is endothermic, requiring heat for maintaining the ammonia cracking reaction ongoing.

It is known that ammonia synthesis catalysts can be used for decomposition or cracking of ammonia. However, it is also well known that water or other oxygen containing compounds poison the ammonia synthesis catalyst. Since water is the main compound in traded liquid ammonia, the poisoning of these synthesis catalysts is considered to be a problem affecting the catalyst performance and therefore influencing how effective and efficient the decomposition process will be. This is at least one of the reasons why other, more expensive, catalysts are commonly used in ammonia cracking.

The most common method used to remove water from ammonia before decomposition or cracking is distillation. The method of the present invention to remove water from ammonia by electrolysis is more efficient and effective than distillation because the energy spent for electrolysis of water into oxygen and hydrogen will not be lost, since the hydrogen thereby produced will end up contributing to the final yield of hydrogen gas produced. Whereas in distillation all the energy spent for separating water from ammonia will be simply lost.

US20130266506 discloses a method for producing hydrogen from ammonia, wherein the process of decomposition of ammonia uses an oxidation catalyst to achieve the generation of heat needed for the decomposition of ammonia (due to the reaction between part of the introduced ammonia with oxygen) at relatively low temperatures, preferably between 400° C. and 650° C. It is directed to reduce the necessary amount of catalyst for ammonia decomposition and producing hydrogen, thereby reducing cost of said production. This method appears to be an alternative to the method of the present invention, however it still requires the use of expensive catalysts for both oxidation and decomposition of ammonia, in order to perform ammonia decomposition at relatively low temperatures.

Other documents disclose the use of different catalysts to decompose ammonia at relatively low temperatures, i.e, approximately 400° C., to optimize the production parameters of hydrogen. These are however, expensive catalysts which will increase the production cost, when compared to that of the present invention. When using less expensive catalysts, such as Fe-based ammonia synthesis catalysts used in the method of the present invention, a much higher temperature range is typically required to achieve a similar efficiency.

To remove water from ammonia before ammonia cracking or decomposition (5) by purging of water accumulated in the bottom of the evaporator (3), in particular, for the ammonia solution to be evaporated, the water will have to be purged from the bottom of the ammonia evaporator. The water purge from the ammonia evaporator will still contain ammonia (approx. 10%), and this ammonia will either be lost or recovered by a distillation process. If not recovered, the ammonia loss in the water purge will be in the order of 10% of the water content of the purchased ammonia, so 0.02-0.05% of the total amount of ammonia feedstock. Secondly, the polluted water purge needs to be disposed safely.

SUMMARY OF INVENTION

The present invention refers to a method for cracking ammonia, comprising electrolysis (2) of water in feed ammonia, evaporation (3), pre-heating (5) and cracking (6) of ammonia, between 300-700° C. using ammonia synthesis catalysts, preferably Fe-based catalysts.

In a second aspect, the present invention refers to a method for producing hydrogen, comprising electrolysis (2) of water in feed ammonia, evaporation (3), pre-heating (5) and cracking (6) of ammonia, between 300-700° C. using ammonia synthesis catalysts, preferably Fe-based catalysts. wherein at least one of the (i) hydrogen produced by electrolysis (2) and (ii) hydrogen resulting from ammonia cracking (6), contribute to the hydrogen final yield.

In a third aspect, the present invention refers to a method for producing electricity where gaseous ammonia, hydrogen and nitrogen are supplied as a feedstock to, e.g. a gas turbine (10) (FIG. 3) wherein cracking (6) of ammonia takes place between 300-700° C., using ammonia synthesis catalysts and wherein at least one of the (i) hydrogen produced by electrolysis (2) and (ii) hydrogen resulting from ammonia cracking (6), contribute to the hydrogen final yield and wherein waste heat is recovered (11) into ammonia evaporator (3).

In a preferred embodiment, hydrogen is produced by electrolysis and/or ammonia cracking in alternating periods of time, e.g. during the day, hydrogen can be obtained mainly from electrolysis of water and during the night hydrogen can be obtained mainly through ammonia cracking. Also, in another preferred embodiment, combustion of ammonia can be used to produce electricity.

The method of the present invention provides for the following advantages:

- Electrolysis of water into hydrogen and oxygen is more efficient than distillation to remove water from ammonia, because the energy spent in said electrolysis will be compensated by the additional hydrogen gas generated;
- Purge from ammonia evaporator downstream electrolysis unit is limited and treated in the electrolysis unit;
- Ammonia synthesis catalysts, preferably Fe-based catalysts, can still be used for ammonia decomposition at relatively low temperatures, e.g. approximately 300-700° C., preferably 350-550° C., being less expensive than customized catalysts for achieving higher efficiency for similar temperature ranges, especially when needed in significant amounts such as in a large scale ammonia decomposition industrial facilities;
- Cost of materials and facilities is lower when operational temperatures are approximately 300-700° C. when compared to costs and frequency for maintenance of high level grade materials necessary when working with higher temperatures. Lower temperatures also allow for generating less waste heat to recover and thus will make the process less expensive and more efficient;
- The overall efficiency obtained, when cracked ammonia obtained by the method of the present invention is used as a feedstock for electricity production, will be significantly high since less energy is required to crack ammonia and less waste heat will be generated from the cracker or decomposition process.
- Protection/prolonged lifetime of catalysts Fe-based due to hydrogen presence, in particular because ammonia may react with the iron based catalyst and form iron nitrides, $Fe_2N$ or $Fe_4N$. This reaction is particularly pronounced at high temperature, typically above 500° C. and in pure ammonia. Iron nitride formation leads to physical decomposition of the catalyst. This could further induce catalyst deactivation, increased pressure drop over the catalyst bed, leading to increased process cost. Hydrogen in the process gas will therefore hinder the iron nitride formation. These considerations are also valid for the reactor material, that hydrogen will protect the materials towards nitridation.

This reaction is rarely or never carried out to completion, meaning that after the ammonia cracker there is still a significant amount of unconverted ammonia. This unconverted ammonia is cooled and it can be recovered in a scrubber by absorption of ammonia in water, or condensed by cooling (7) and the liquid ammonia is recycled back to the electrolyzer (if it contains water) or the evaporator (if it is water free). If we choose to use water in the cooling stage for removing traces of ammonia, we are ensuring that the product gases, $H_2$ and $N_2$, are ammonia free. Using the shown configuration, hydrogen may be partially or entirely produced, e.g., during the day, from electrolysis and, e.g., during the night, partially or entirely by cracking ammonia. Furthermore, hydrogen purification can be achieved by PSA or other suitable technology.

Figure 3:
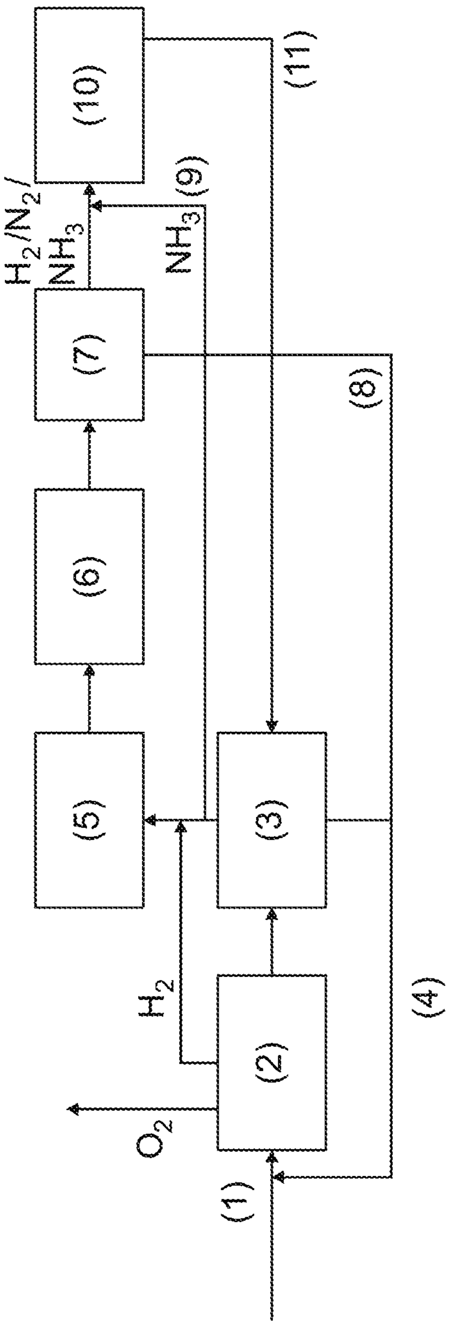

FIG. 3 shows the integration with a gas turbine for achieving maximum overall efficiency in production of electrical power. The product gases hydrogen and nitrogen are used as gas turbine fuel and ammonia could be also present, either unconverted ammonia from cracking (6) or bypassed (9) before cracking. Gaseous ammonia may be added to the cracking process.

Reference numbers used are the following:

(1) Make-up ammonia (0.2-0.5% water)
(2) Water electrolyzer
(3) Evaporation
(4) Purge $H_2O/NH_3$
(5) Pre-heating
(6) Cracking or Decomposition
(7) Cooling
(8) Recycled condensed unconverted ammonia (with or without water)
(9) Bypassed ammonia
(10) Gas turbine
(11) Waste heat

Definitions

Ammonia Cracking or Decomposition is process of dissociation of gaseous anhydrous Ammonia ($NH_3$) into a mixture of Hydrogen ($H_2$) and Nitrogen ($N_2$) according to the reaction: $2NH_3=N_2+3H_2$. This reaction is endothermic. The process is commonly performed at high temperatures between 1560-1740° F. (850-950° C.) in the presence of nickel as catalyst. Due to the higher temperatures required, lifetime of the catalysts will be reduced due to the thermal sintering of the catalyst. The resulting gas mixture is composed of hydrogen and nitrogen in the proportion 3:1 (75% of $H_2$ and 25% of $N_2$) with very little amount (20-100 ppm) of residual undissociated ammonia with dew point −60° F. to −20° F. (−51° C. to −29° C.). When performed under the conditions of the present invention, catalysts are preferably Fe-based and the process is performed at lower temperatures, between approximately 300-700° C.

Ammonia cracker means any suitable reactor where ammonia cracking (6) can take place, comprising fired reactors, preferably SMR.

Ammonia synthesis catalysts mean, within the context of the present invention, any catalysts suitable for synthesizing ammonia and also suitable for cracking ammonia. These catalysts are preferably iron (Fe) based, but may also comprise other catalysts suitable for the same purpose and operating at similar conditions.

Ammonia slip means unconverted ammonia (not dissociated in the cracking process) passing through the ammonia cracker.

Electrolysis of water means decomposition of water into oxygen and hydrogen gas due to the passage of an electric current.

Feed ammonia or Ammonia Feedstock means a solution comprising make-up ammonia and additional water. Feed ammonia is the solution fed or supplied to electrolyzer (2).

High-pressure electrolysis (HPE) is the electrolysis of water by decomposition of water ($H_2O$) into oxygen ($O_2$) and hydrogen gas ($H_2$) due to the passing of an electric current through the water at elevated pressure, typically above 10 bar.

Make-up ammonia or Traded Ammonia comprises ammonia ($NH_3$) and water ($H_2O$), preferably between 0.2 to 0.5% of water content. It is usually supplied as a liquid but may also be a solution comprising different physical states. The effect of water comprised in ammonia feedstock in the ammonia decomposition process is primarily that due to poisoning the process, which usually has to take place at a high temperatures. This will increase process cost for ammonia decomposition as well as cost of construction materials in the plant. According to National Bureau of Standards ammonia shall conform to the following properties: minimum purity of 99.98% (wt), maximum 0,0005% (wt) oil and maximum 0.02% (wt) moisture.

Nitridation means the formation of nitrogen compounds through the action of ammonia.

PSA means pressure swing adsorption.

A residual amount of water due to any slip from the electrolysis unit will build up in the evaporator and needs to be purged (4). This purge contains water and ammonia can be recycled back into ammonia feedstock (1) and thus the electrolysis unit which means that the overall water content in the evaporated ammonia is close to zero.

DESCRIPTION OF THE INVENTION

In order to be suitable as fuel for power production, ammonia needs to be, at least partially, cracked to a gas mixture comprising gaseous hydrogen, nitrogen and ammonia. When using ammonia as an energy carrier for hydrogen production and having only ammonia as the energy source, it is economically essential to maximize the hydrogen production per ton of ammonia consumed. This can be obtained by cracking or decomposing ammonia at the lowest possible temperature since this will result in a lower amount of waste heat to be recovered. In this case, waste heat recovered as steam will have only little value as hydrogen is a product of interest.

In the ammonia cracking process, gaseous ammonia is dissociated into a mixture of hydrogen and nitrogen in the reversible reaction:

$$2NH_{3\,(g)} \leftrightarrows N_{2\,(g)} + 3H_{2\,(g)}$$

The reaction is endothermic, requiring heat for maintaining the ammonia cracking reaction.

It has been known that ammonia synthesis catalysts can be used for decomposition or cracking of ammonia. However, it is also well known that water or other oxygen containing compounds will be poisoning to the ammonia synthesis catalysts, such as Fe-based catalysts. Since water is the main compound in traded liquid ammonia or make-up ammonia (1), the poisoning of these synthesis catalysts is considered to be a problem affecting the catalyst performance and therefore how effective and efficient the decomposition process will be. This is at least one of the reasons why other, more expensive, catalysts are commonly used in ammonia cracking.

The most common method used to remove water from ammonia before decomposition is distillation. The method of this invention to remove water from ammonia by electrolysis is more efficient and effective than typical distillation because the energy spent for electrolysis of water into oxygen and hydrogen will not be lost, since the hydrogen thereby produced will end up contributing to the product gas. Whereas in distillation all the energy spent for separating water from ammonia will be simply lost.

For a conventional ammonia cracker using a catalyst that can tolerate water, the 0.2-0.5% water content in the make-up ammonia (1) will not harm the catalyst. These catalysts operate at high temperatures, above 600° C. and up to approximately 950° C. By removing water from the make-up ammonia (1), it will be possible to use alternative catalysts, similar to those used for ammonia synthesis at lower temperatures, typically in the range of 300-700° C., preferably between 350-550° C. Such ammonia synthesis catalysts are preferably iron (Fe) based, or other catalysts suitable for the same purpose and are typically purchased at much lower cost than the high temperature catalysts that tolerate water and other oxygen containing compounds, commonly used in ammonia cracking.

By operating the ammonia cracker at lower temperatures, lower grade materials of construction can be used and therefore capital expenditure is also lower. Lower temperature also creates less waste heat to recover and thus will make the process cheaper and more efficient.

Make-up ammonia comprises approximately 0.2 to 0.5% water and said water is electrolyzed (2) together with an optional supplementary amount of water added to said make-up ammonia before entering the electrolyzer (2). Feed ammonia is the liquid composition supplied to electrolyzer (2), comprising make-up ammonia and said optional supplementary amount of water, depending on the desired amount of hydrogen to be obtained by electrolysis. The effect of water addition is to increase the hydrogen produced by electrolysis, adjusting the hydrogen production from renewable energy in the electrolyzer. Also, hydrogen protects catalysts and materials from nitriding.

Figure 1:
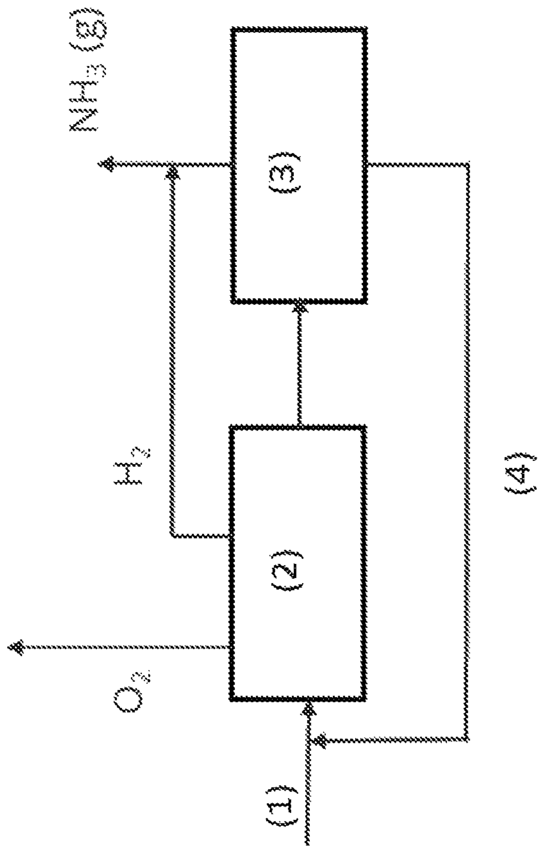
FIG. 1 shows the pre-treatment of ammonia before decomposition, where water is electrolyzed (2).
Figure 2:
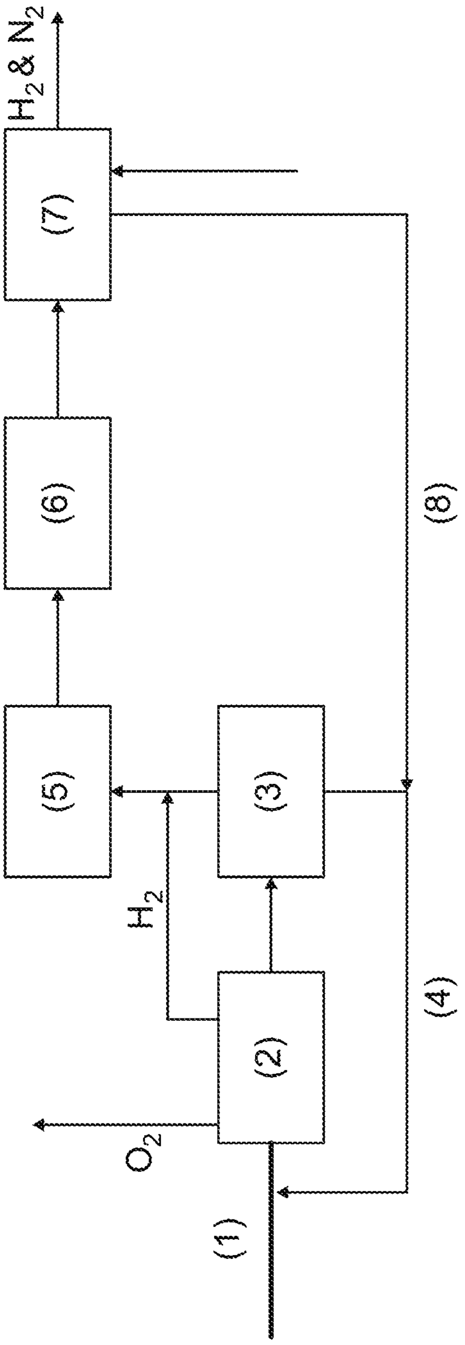
FIG. 2 shows the methods of the present invention. In the ammonia cracker, the following reaction takes place: $2NH_3=N_2+3H_2$.

In a preferred embodiment, water is added to make-up ammonia (1) originating feed ammonia which will be electrolyzed (2) to hydrogen and oxygen and adjust the hydrogen content in the evaporated ammonia feeding the first ammonia cracker (FIG. 2), when having more than one cracker (6).

In a preferred embodiment of the present invention, the cracked ammonia gas is feedstock to a gas turbine for electricity production, an overall efficiency can be much higher if a significant amount of gaseous ammonia is bypassed the cracker, as shown in FIG. 3. The overall efficiency will be higher since less energy is required to crack ammonia and less waste heat will be generated from the cracker process. In this case it is foreseen not to have sufficient waste heat to evaporate the total ammonia feedstock, then waste heat can be recovered from the gas turbine flue gas without decreasing the gas turbine combined cycle efficiency as the required temperature level for ammonia evaporation is lower than approximately 100° C. and thus available. A significant amount of gaseous ammonia bypassed may be up to approximately 98% of the available ammonia and then we would require heat from the gas turbine exhaust. Depending on the gas turbine technology, if we bypass too much we will not have enough heat to evaporate all the ammonia. This is why the heat from the gas turbine is used. The higher is the ammonia content, the higher is overall efficiency.

Preferred Embodiments

1. Method for cracking ammonia, comprising:
- a) electrolysis (2) of water in feed ammonia, wherein feed ammonia comprises make-up ammonia;
- b) evaporation (3);
- d) cracking (6); and wherein cracking (6) of ammonia takes place between 300-700° C., most preferably between 350-550° C., using ammonia synthesis catalysts.

2. Method for producing hydrogen from make-up ammonia (1) comprising:
- a) electrolysis (2) of water in feed ammonia, wherein feed ammonia comprises make-up ammonia;
- b) evaporation (3);
- d) cracking (6); and
- e) cooling (7) of the gas phase resulting from cracking (6), wherein cracking (6) of ammonia takes place between 300-700° C., most preferably between 350-550° C., using ammonia synthesis catalysts and wherein at least one of the (i) hydrogen produced by electrolysis (2) and (ii) hydrogen resulting from ammonia cracking (6), contribute to the hydrogen final yield.

3. Method according to embodiments 1 and 2 wherein ammonia is pre-heated (5) before the cracking (6) stage.

4. Method according to embodiments 1 to 3, wherein said make-up ammonia (1) comprises from approximately 0.2 up to approximately 2% of water.

5. Method according to embodiments 1-4, wherein ammonia synthesis catalysts are Fe-based catalysts.

6. Method according to embodiments 1-4, wherein catalysts used are Co, Ru or Ni based.

7. Method according to embodiments 1 to 5, wherein a solution comprising liquid ammonia and non-evaporated water is purged (4) from evaporator (3) and recycled back into feed ammonia.

8. Method according to embodiments 1-6 wherein the electrolysis is a high-pressure electrolysis.

9. Method according to embodiments 1-7 wherein hydrogen resulting from ammonia cracking is recycled with an external compressor.

10. Method according to embodiments 1 to 9, wherein water is added to the cooling (7) step e) and a scrubber is used for removing traces of unconverted ammonia.

11. Method according to embodiment 10 wherein unconverted ammonia is condensed (8) and recycled to the electrolyzer (2) when it contains water or to the evaporator (3) when it is water free.

12. Method for removal of water from ammonia, comprising the following steps:
- a) electrolysis (2) of water in feed ammonia, wherein feed ammonia comprises make-up ammonia; and
- b) evaporation (3).

13. Use of ammonia obtainable by the method according to embodiment 12 in ammonia cracking and/or hydrogen production wherein catalysts such as Fe-based catalysts are used.

14. Use of ammonia obtainable by the method according to embodiment 12 in ammonia cracking and/or hydrogen production wherein Co, Ru or Ni-based catalysts may be used.

15. Method for producing electricity, feeding a gas turbine (10) with at least one of hydrogen, nitrogen and ammonia obtained by:
- a) electrolysis (2) of water in feed ammonia, wherein feed ammonia comprises make-up ammonia;
- b) evaporation (3);
- c) cracking (6); and
- d) cooling (7) of the gas phase resulting from cracking (6), wherein cracking (6) of ammonia takes place between 300-700° C., most preferably between 350-550° C., using ammonia synthesis catalysts and wherein at least one of the (*i*) hydrogen produced by electrolysis (2) and (ii) hydrogen resulting from ammonia cracking (6), contribute to the hydrogen final yield and wherein waste heat is recovered (11) into ammonia evaporator (3).

16. Method according to embodiment 15 wherein ammonia is pre-heated (5) before the cracking (6) stage.

17. Method according to embodiments 15 and 16 wherein part of the ammonia is cracked (6) and part of the ammonia is bypassed (9) to feed a gas turbine (10).

18. Method according to embodiments 15 to 17 wherein hydrogen is periodically and/or alternatively produced, e.g. during the day partly or entirely from electrolysis and during the night partly or entirely by cracking ammonia.

19. Use of the method according to embodiments 15 to 18 for producing electricity by feeding a gas turbine (10) with at least one of hydrogen (2,7), nitrogen (7) and ammonia (7, 9).

20. Use of the method according to embodiments 15 to 18 for producing hydrogen and oxygen (2), evaporated ammonia (3) and gaseous hydrogen, nitrogen and ammonia from make-up ammonia.

The invention claimed is:

1. A method for cracking ammonia, comprising:
- a) electrolysis of water in feed ammonia, wherein feed ammonia comprises make-up ammonia;
- b) evaporation;
- c) cracking;

wherein cracking of ammonia takes place between 300-700° C., using ammonia synthesis catalysts.

2. The method according to claim 1, wherein ammonia is pre-heated before the cracking stage.

3. The method according to claim 1, wherein said make-up ammonia comprises from approximately 0.2 up to approximately 2% of water.

4. The method according to claim 1, wherein ammonia synthesis catalysts are Fe-based.

5. The method according to claim 1, wherein catalysts used are Co, Ru or Ni based.

6. The method according to claim 1, wherein a solution comprising liquid ammonia and non-evaporated water is purged from evaporator and recycled back into feed ammonia.

7. The method according to claim 1, wherein the electrolysis is a high-pressure electrolysis.

8. The method according to claim 1, wherein hydrogen resulting from ammonia cracking is recycled with an external compressor.

9. The method according to claim 1, wherein water is added to the cooling step e) and a scrubber is used for removing traces of unconverted ammonia.

10. The method according to claim 9 wherein unconverted ammonia is condensed and recycled to the electrolyzer when it contains water or to the evaporator when it is water free.

11. A method for producing electricity, feeding a gas turbine with at least one of hydrogen, nitrogen and ammonia obtained by:

a) electrolysis of water in feed ammonia, wherein feed ammonia comprises make-up ammonia;

b) evaporation;

c) cracking; and d) cooling of the gas phase resulting from cracking, wherein cracking of ammonia takes place between 300-700° C., using ammonia synthesis catalysts and wherein at least one of the (i) hydrogen produced by electrolysis and (ii) hydrogen resulting from ammonia cracking, contribute to the hydrogen final yield and wherein waste heat is recovered into ammonia evaporator.

12. The method according to claim 11, wherein part of the ammonia is cracked and part of the ammonia is bypassed to feed a gas turbine.

13. The method according to claim 11, comprising using the method for producing electricity by feeding a gas turbine with at least one of hydrogen, nitrogen and ammonia.

14. A method for producing hydrogen from make-up ammonia comprising:

a) electrolysis of water in feed ammonia, wherein feed ammonia comprises make-up ammonia;

b) evaporation;

c) cracking; and d) cooling of the gas phase resulting from cracking, wherein cracking of ammonia takes place between 300-700° C., using ammonia synthesis catalysts and wherein at least one of the (i) hydrogen produced by electrolysis and (ii) hydrogen resulting from ammonia cracking, contribute to the hydrogen final yield.

* * * * *